United States Patent
Gibree

(10) Patent No.: US 8,434,821 B2
(45) Date of Patent: May 7, 2013

(54) CAR SEAT WITH INTEGRATED RATCHET

(75) Inventor: Steven Gibree, Woonsocket, RI (US)

(73) Assignee: Summer Infant (USA), Inc., Woonsocket, RI (US)

( * ) Notice: Subject to any disclaimer, the term of this patent is extended or adjusted under 35 U.S.C. 154(b) by 100 days.

(21) Appl. No.: 12/906,724

(22) Filed: Oct. 18, 2010

(65) Prior Publication Data

US 2011/0089731 A1 Apr. 21, 2011

Related U.S. Application Data

(60) Provisional application No. 61/252,553, filed on Oct. 16, 2009, provisional application No. 61/391,132, filed on Oct. 8, 2010.

(51) Int. Cl.
*A47C 1/08* (2006.01)
*A47C 1/11* (2006.01)

(52) U.S. Cl.
USPC .................................. 297/250.1; 297/256.16

(58) Field of Classification Search ............... 297/250.1, 297/256.16
See application file for complete search history.

(56) References Cited

U.S. PATENT DOCUMENTS

| | | | |
|---|---|---|---|
| 6,024,408 A | 2/2000 | Bello et al. | |
| 6,047,451 A | 4/2000 | Berger et al. | |
| 6,105,211 A | 8/2000 | Berger | |
| 6,230,370 B1 | 5/2001 | Nelsen | |
| 6,247,208 B1 | 6/2001 | Creech | |
| 6,273,353 B1 | 8/2001 | Berger | |
| 6,279,847 B1 | 8/2001 | Berger | |
| 6,749,260 B2 | 6/2004 | Abel | |
| 6,764,135 B2* | 7/2004 | Sasaki et al. | 297/256.16 |
| 7,077,475 B2* | 7/2006 | Boyle | 297/250.1 |
| 7,246,854 B2* | 7/2007 | Dingman et al. | 297/250.1 X |
| 7,422,283 B2* | 9/2008 | Patterson et al. | 297/250.1 X |
| 7,887,129 B2* | 2/2011 | Hei et al. | 297/256.16 |

* cited by examiner

*Primary Examiner* — Anthony D Barfield
(74) *Attorney, Agent, or Firm* — Chace Ruttenberg & Freedman, LLP; LuAnn Cserr

(57) ABSTRACT

A child car seat includes a seat base configured to hold a child seat carrier and a ratchet system. The ratchet system includes a housing coupled to the seat base, a handle movably coupled to the housing, and a spindle movably coupled to the handle and to the housing. The spindle has a longitudinal slot configured to hold a belt. The ratchet system is configured to move the spindle with the handle in a first direction and to move the handle in a second direction without moving the spindle.

11 Claims, 16 Drawing Sheets

CAR SEAT WITH INTEGRATED RATCHET

CROSS REFERENCE TO RELATED APPLICATIONS

The present application claims priority to U.S. Provisional patent application No. 61/252,553 filed Oct. 16, 2009, and U.S. Provisional patent application No. 61/391,132 filed Oct. 8, 2010, the disclosures of which are incorporated by reference herein in their entirety.

TECHNICAL FIELD

The present invention relates to child car seats, and more specifically to child car seats with an integrated ratchet system.

BACKGROUND ART

Child car seats must be properly installed in a motor vehicle in order to function as intended. Proper installation takes into consideration such factors as secure attachment of a base component to the vehicle and of a child seat component to the base component. In addition, the proper alignment of the child seat assembly is required once it is securely installed. The installation and set-up process can be time-consuming, cumbersome and uncertain as subjective judgment is used during the installation process by the person installing the car seat.

SUMMARY OF EMBODIMENTS

In accordance with one embodiment of the invention, a child car seat includes a seat base configured to hold a child seat carrier and a ratchet system. The ratchet system includes a housing coupled to the seat base, a handle movably coupled to the housing, and a spindle movably coupled to the handle and to the housing. The spindle has a longitudinal slot configured to hold a belt. The ratchet system is configured to move the spindle with the handle in a first direction and to move the handle in a second direction without moving the spindle.

In some embodiments, the child car seat may further include a control console removably coupled to the seat base and in communication with the ratchet system. The control console may further include a user interface having at least one input and at least one output. The ratchet system may further include a belt tension indicator system coupled to the housing. The belt tension indicator system may include a bottom member coupled to the housing, a top member movably coupled to the bottom member and configured to contact a belt, and one or more resistance members positioned between a portion of the top member and a portion of the bottom member. The one or more resistance members may be configured to allow the top member to move relative to the bottom member when sufficient force is applied to the top member. The belt tension indicator system may further include a switch positioned adjacent to the top member. The belt tension indicator system may be configured such that a contact on the top member contacts the switch when appropriate force is applied to the top member. When the child car seat includes a control console, the belt tension indicator system may be configured to send a signal to the control console when the contact contacts the switch. The one or more resistance members may include springs. The top member may include an opening configured to receive the belt. The child car seat may further including the belt. The ratchet system may further include a release mechanism that allows the spindle to move in the first direction and the second direction. The release mechanism may be actuated by a button on the handle. The ratchet system may further include a ratchet wheel having one or more notches and movably coupled to the handle and coupled to the spindle, and a pawl configured to engage with the one or more notches. The ratchet wheel and the pawl may be configured such that the handle moves the ratchet wheel when the handle moves in the first direction and the pawl engages the one or more notches and prevents the ratchet wheel from moving when the handle moves in the second direction.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

Various embodiments of the present invention provide a child car seat having a car seat base and a child seat carrier that is configured to be removably attached to the car seat base. The car seat base includes an integrated ratchet system that allows the base to be secured to a seat in a vehicle with relative ease. The integrated ratchet system may include a belt tension indicator system that indicates when an appropriate amount of tension is applied to the belt. The car seat base may also include a level indicator system that indicates the angle of inclination of the car seat base relative to ground, permitting the proper orientation of the base in the vehicle seat. The car seat base may also have a control system that indicates when the seat base has attained an appropriate orientation and that indicates when the integrated ratchet system has sufficiently secured the base to the vehicle seat. This configuration readily permits the proper installation of the child car seat within the vehicle. Details of illustrative embodiments are discussed below.

Figure 1:
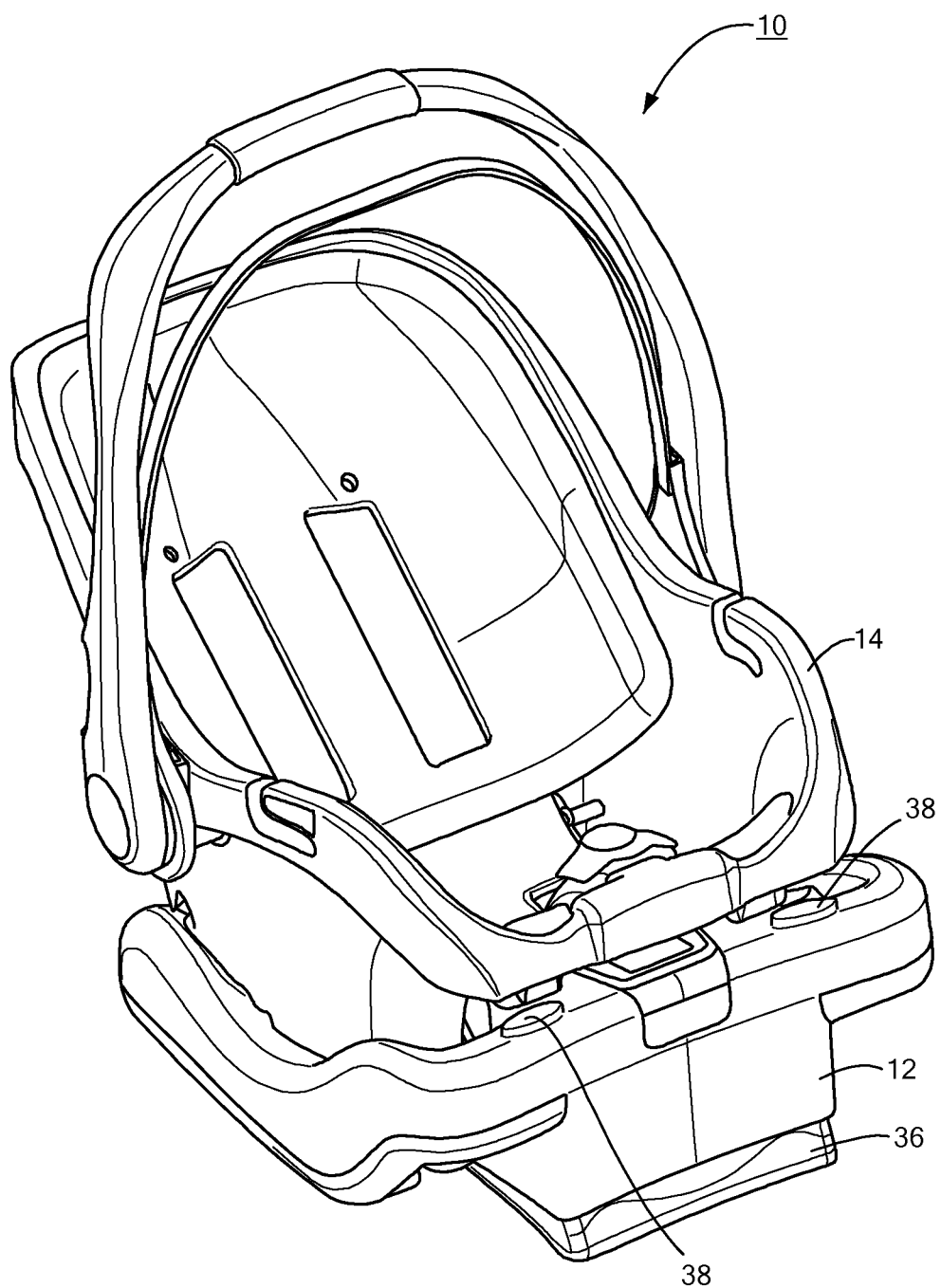
FIG. 1 schematically shows a perspective view of a child car seat according to embodiments of the present invention.
Figure 2:
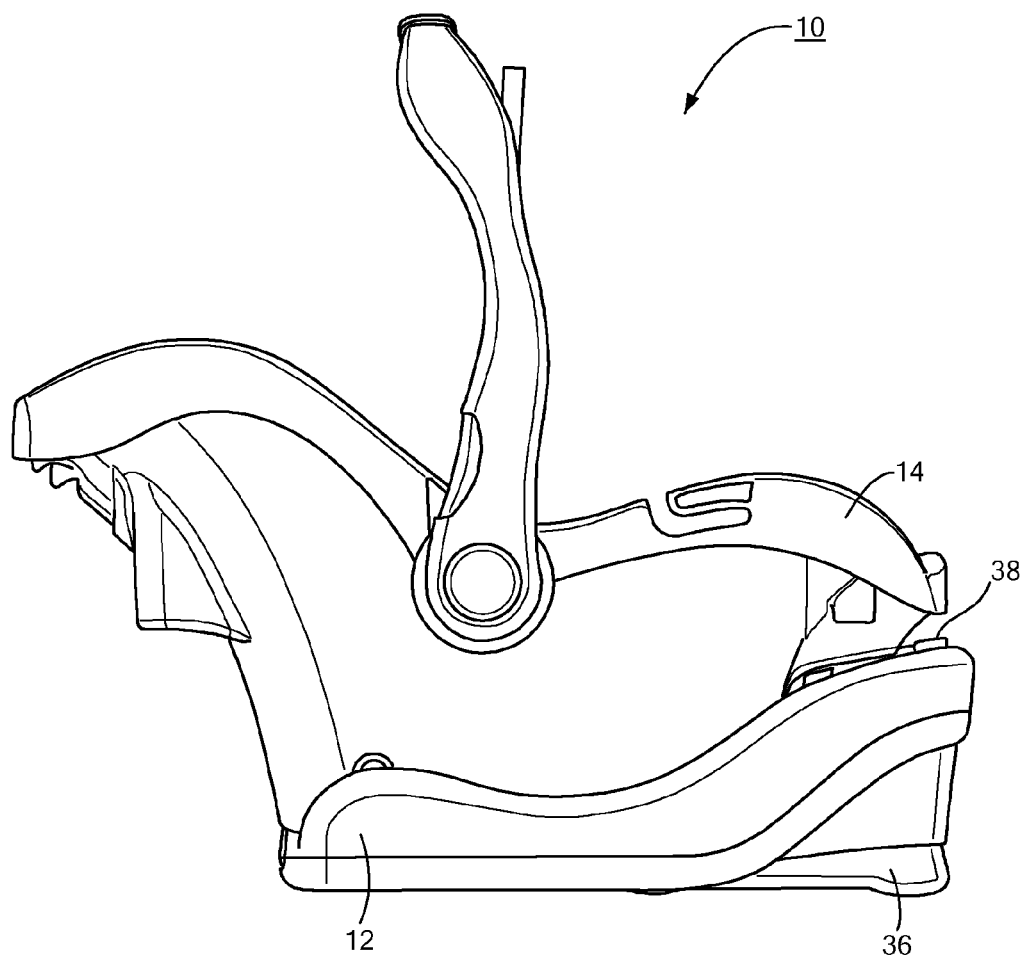
FIG. 2 schematically shows a side view of a child car seat according to embodiments of the present invention.
Figure 3:
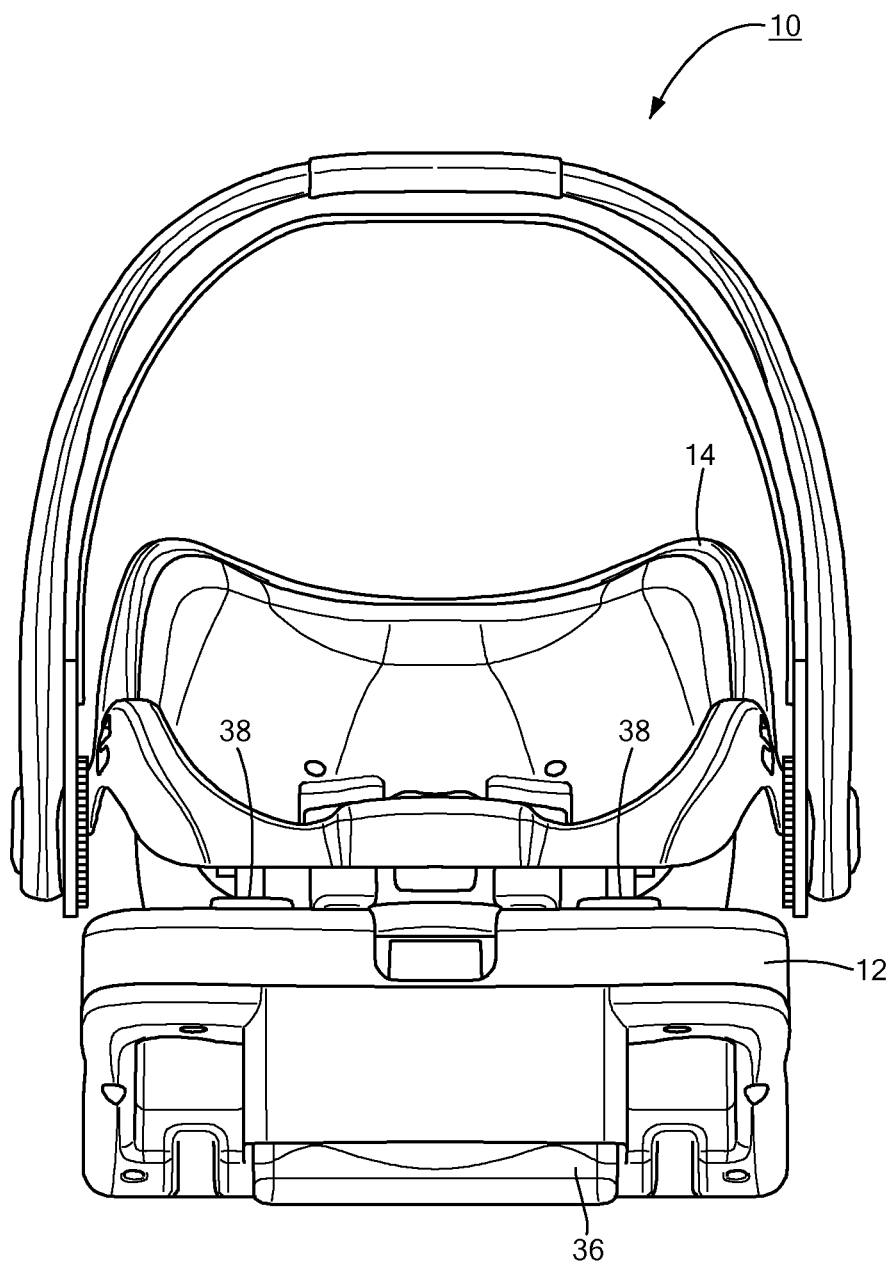
FIG. 3 schematically shows a back view of a child car seat according to embodiments of the present invention.
Figure 4:
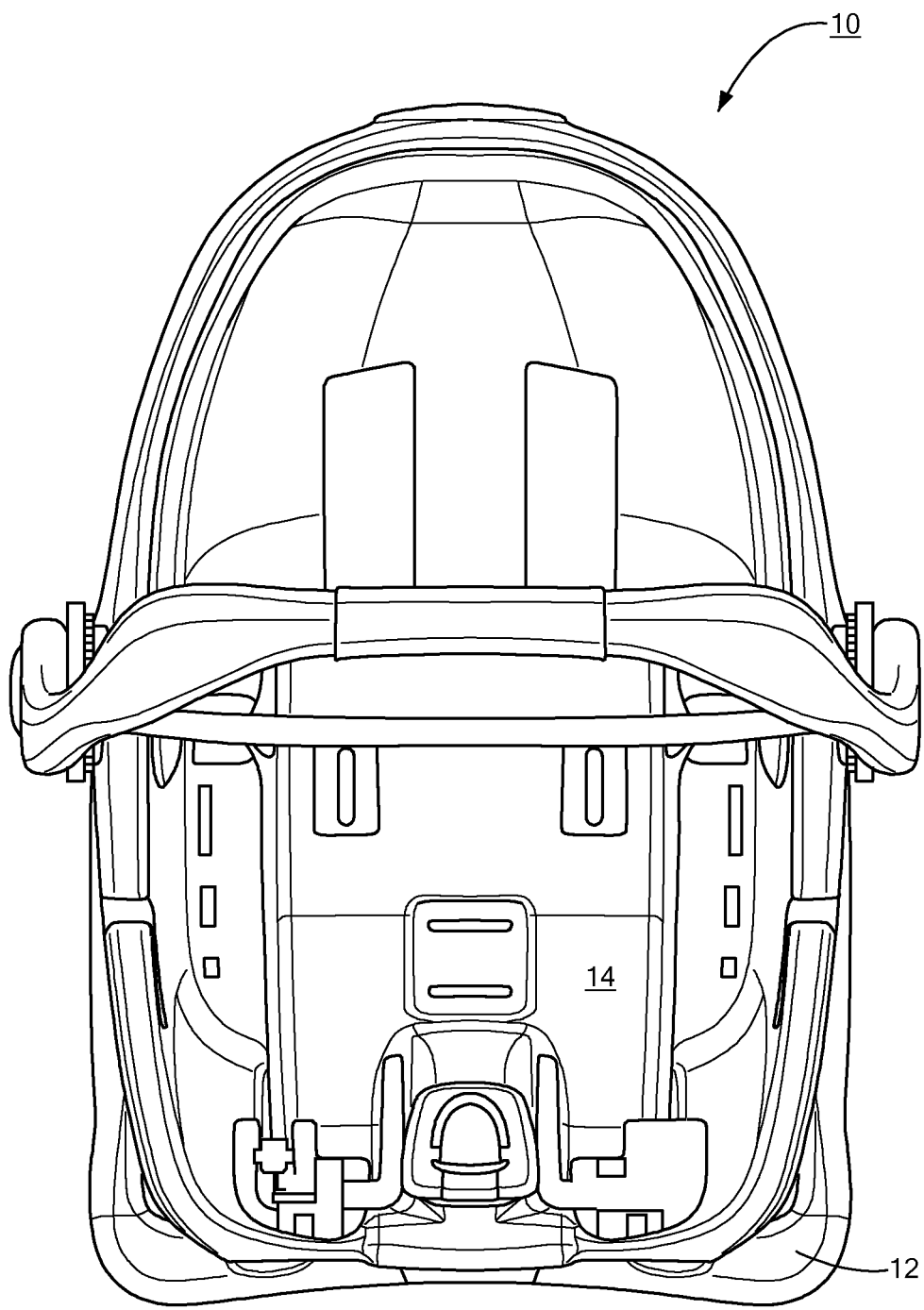
FIG. 4 schematically shows a top view of a child car seat according to embodiments of the present invention.
Figure 5:
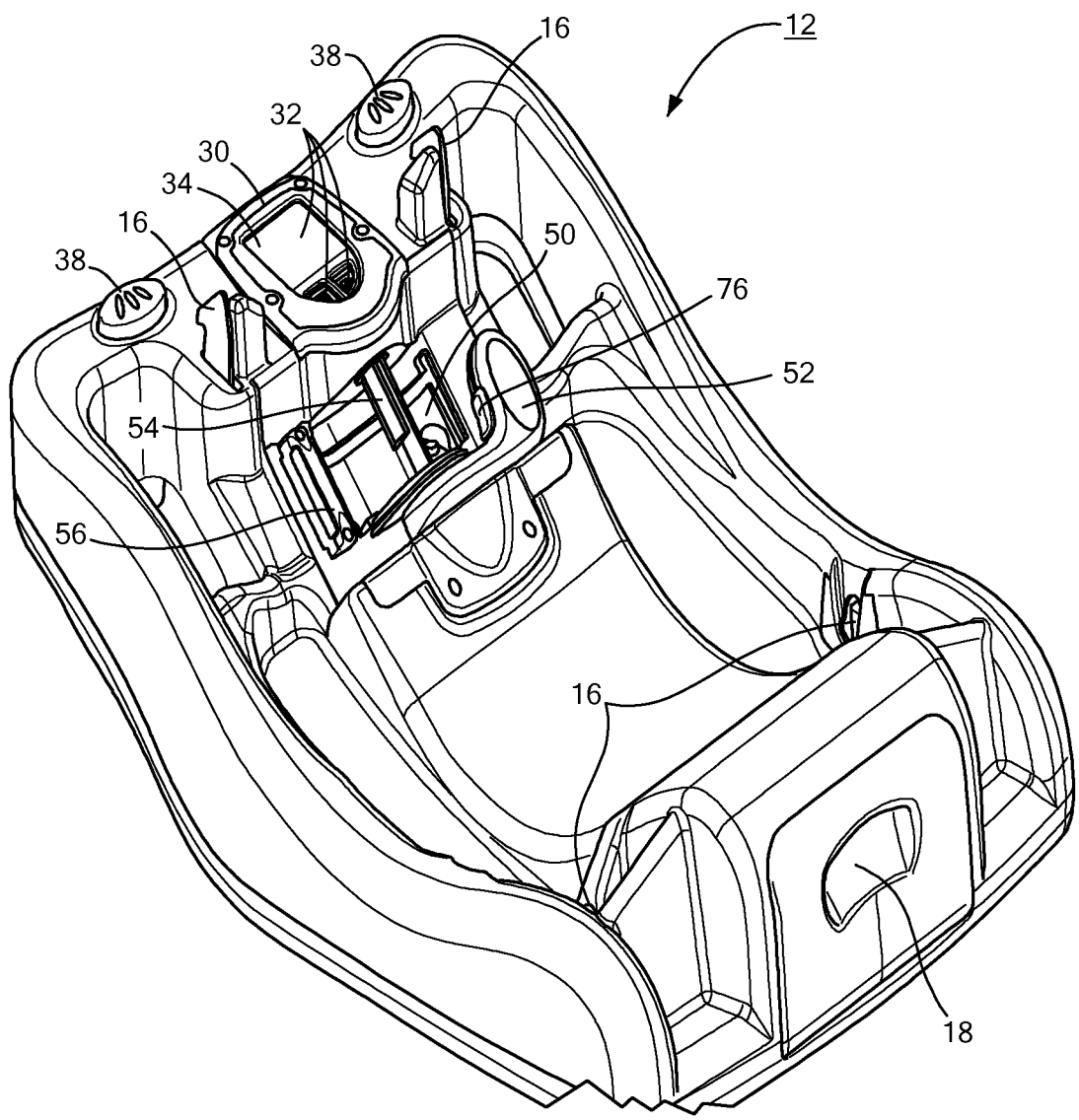
FIG. 5 schematically shows a perspective view of a car seat base according to embodiments of the present invention.

FIGS. 1-4 schematically show a child car seat 10 according to embodiments of the present invention. The car seat 10 includes a car seat base 12 and a child seat carrier 14 that is configured to be removably attached to the car seat base 12. FIG. 5 schematically shows the car seat base 12 without the seat carrier 14 attached. Referring also to FIG. 5, the seat carrier 14 is attached to the car seat base 12 by hooks 16 in the car seat base 12 that engage corresponding anchor or plate structures (not shown) in the seat carrier 14. The hooks 16 may be retracted from the corresponding structures by pulling upward on a release lever 18, thus allowing the seat carrier 14 to be removed from the car seat base 12.

Figure 6:
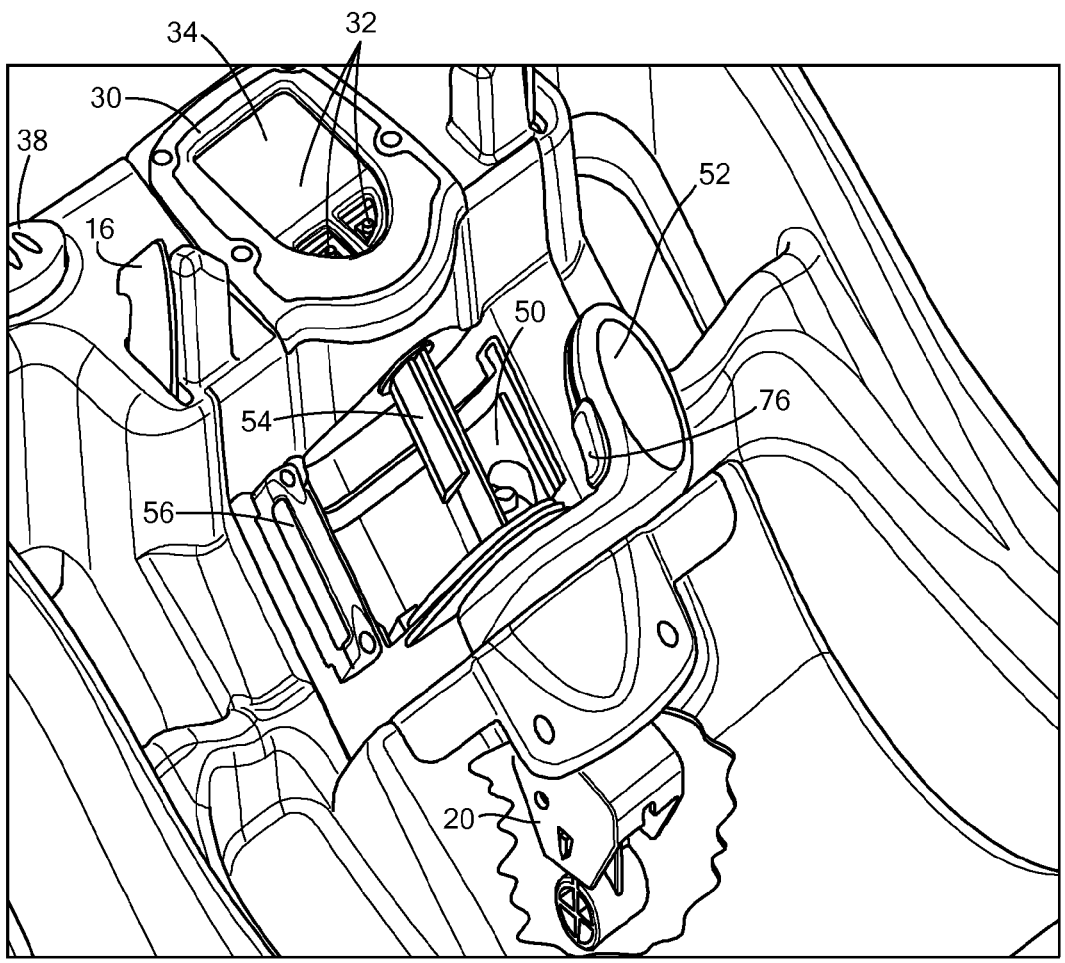
FIG. 6 schematically shows a perspective view of a portion of the car seat base showing the integrated ratchet system and level indicator system according to embodiments of the present invention.
Figure 7:
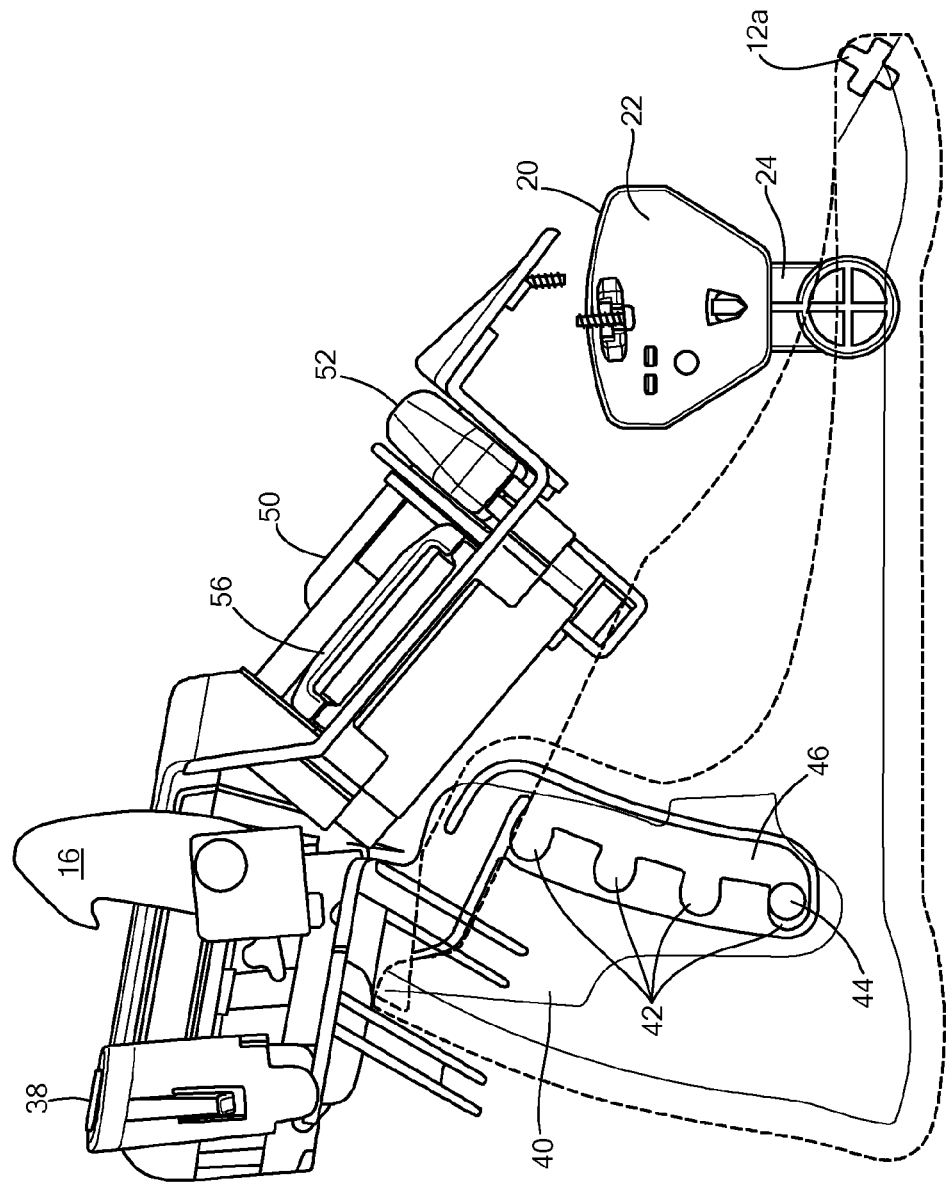
FIG. 7 schematically shows a side view of a portion of the car seat base with some sections removed showing the integrated ratchet system and level indicator system according to embodiments of the present invention.
Figure 9:
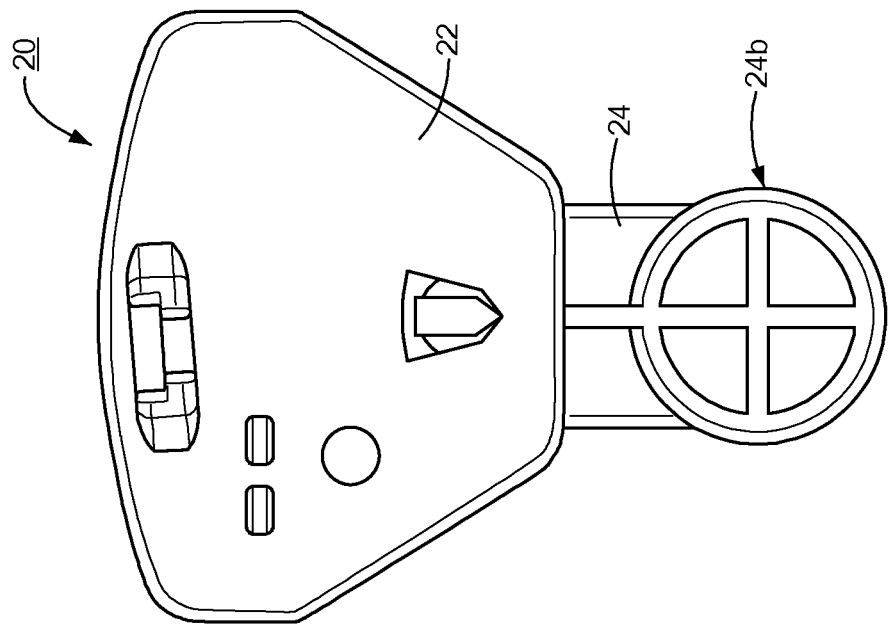
FIG. 9 schematically shows a side view of the level indicator system of FIG. 8 according to embodiments of the present invention.
Figure 8:
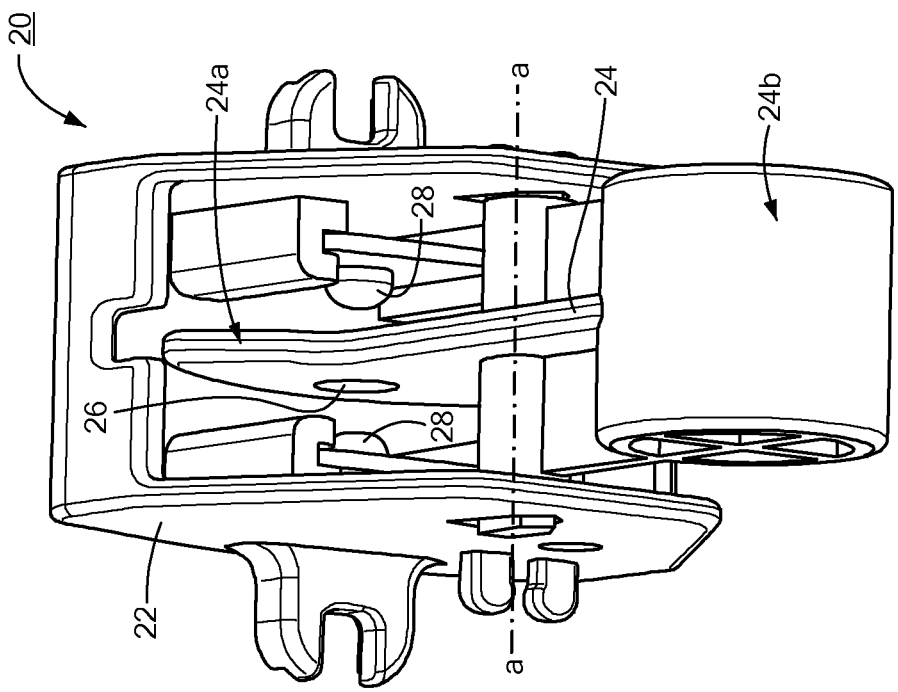
FIG. 8 schematically shows a perspective bottom view of the level indicator system according to embodiments of the present invention.
Figure 10:
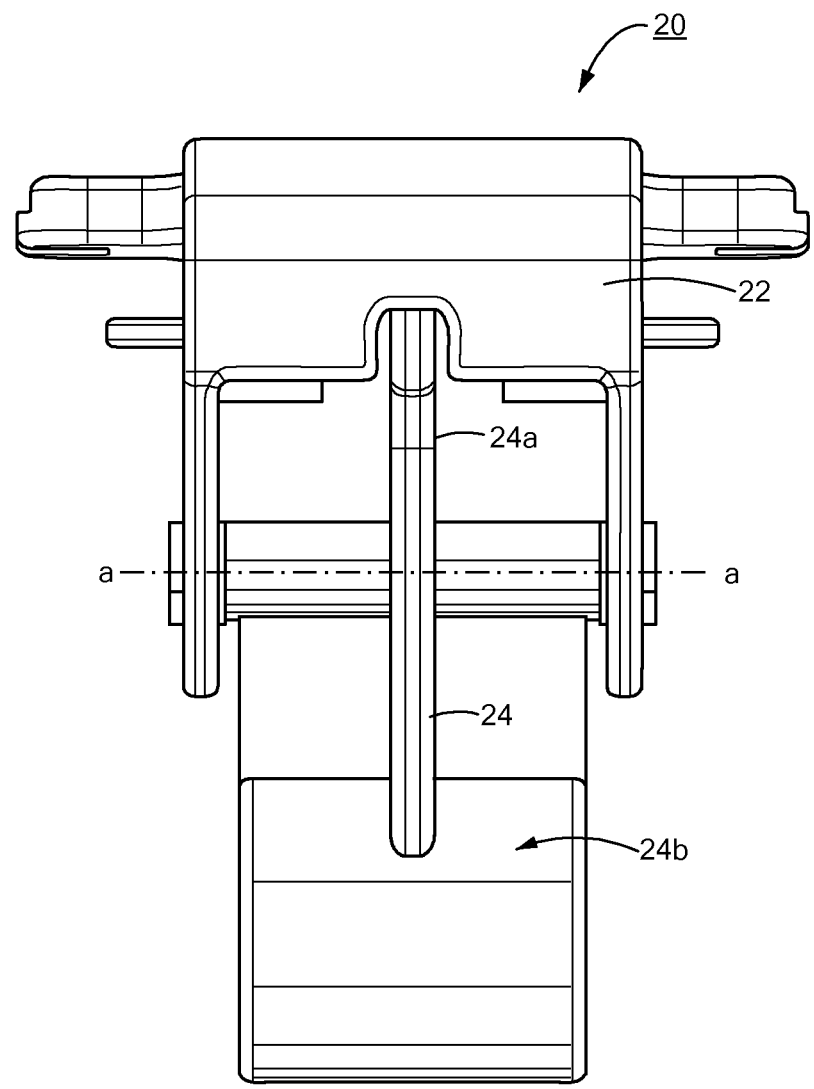
FIG. 10 schematically shows a front view of the level indicator system of FIG. 8 according to embodiments of the present invention.
Figure 11:
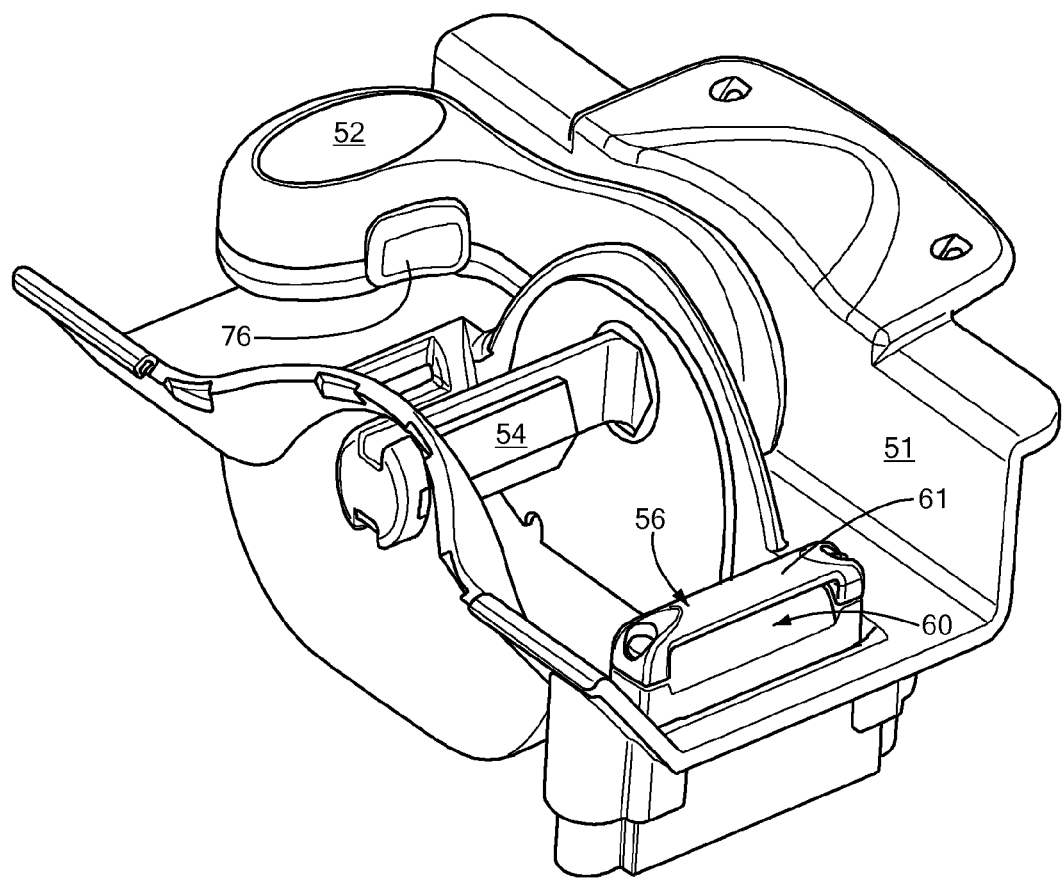
FIG. 11 schematically shows a perspective view of the integrated ratchet system with other portions of the car seat base removed according to embodiments of the present invention.
Figure 12:
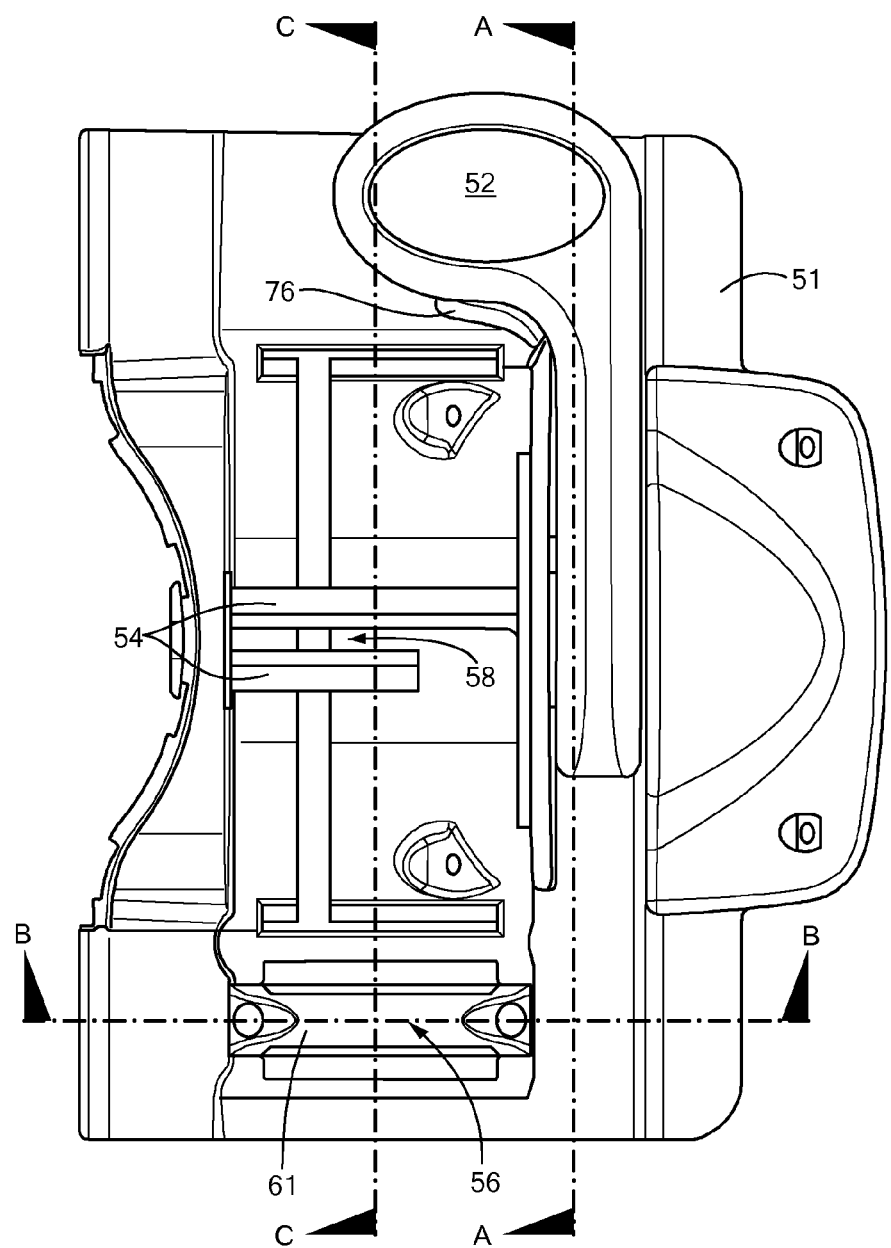
FIG. 12 schematically shows a top view of the integrated ratchet system shown in FIG. 11 according to embodiments of the present invention.
Figure 13:
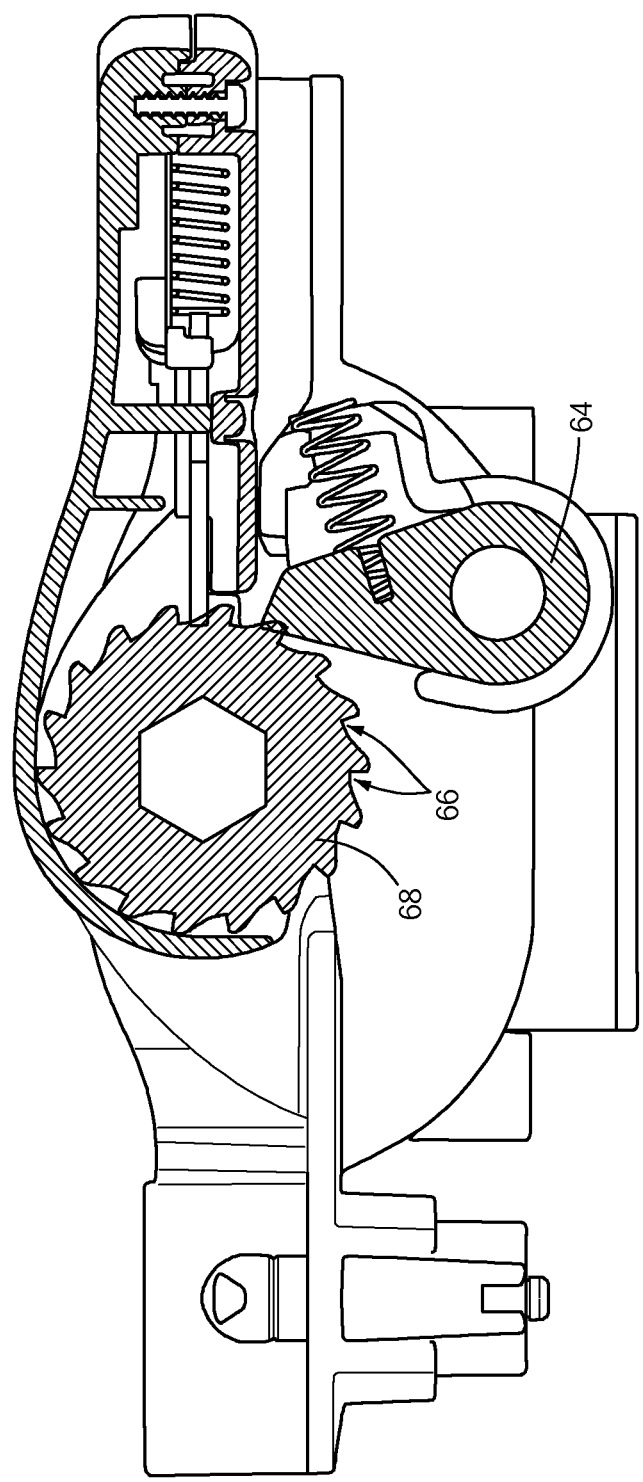
FIG. 13 schematically shows a cross-sectional view of the integrated ratchet system along lines A-A of FIG. 12 according to embodiments of the present invention.
Figure 14:
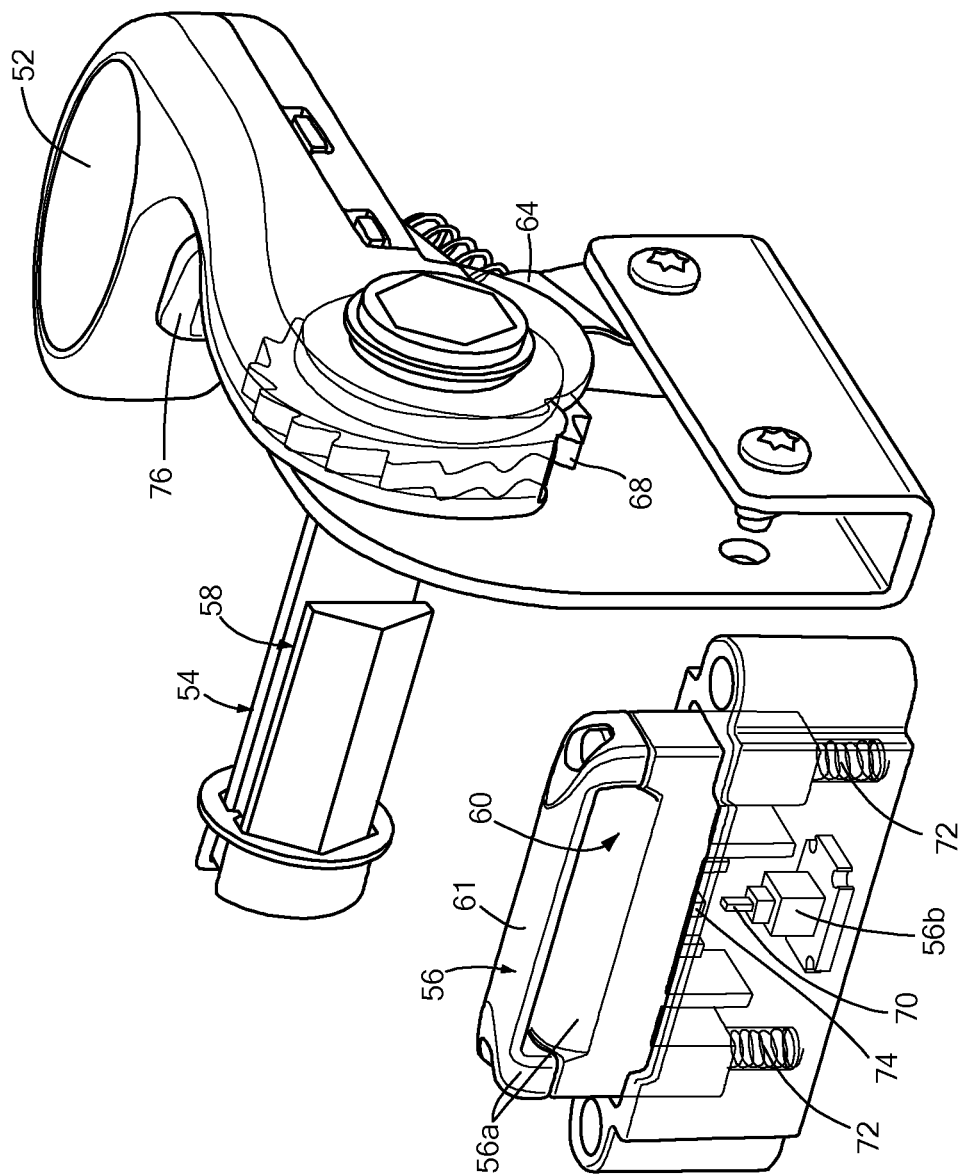
FIG. 14 schematically shows a perspective view of portions of the integrated ratchet system showing the belt tension indicator system according to embodiments of the present invention.
Figure 15:
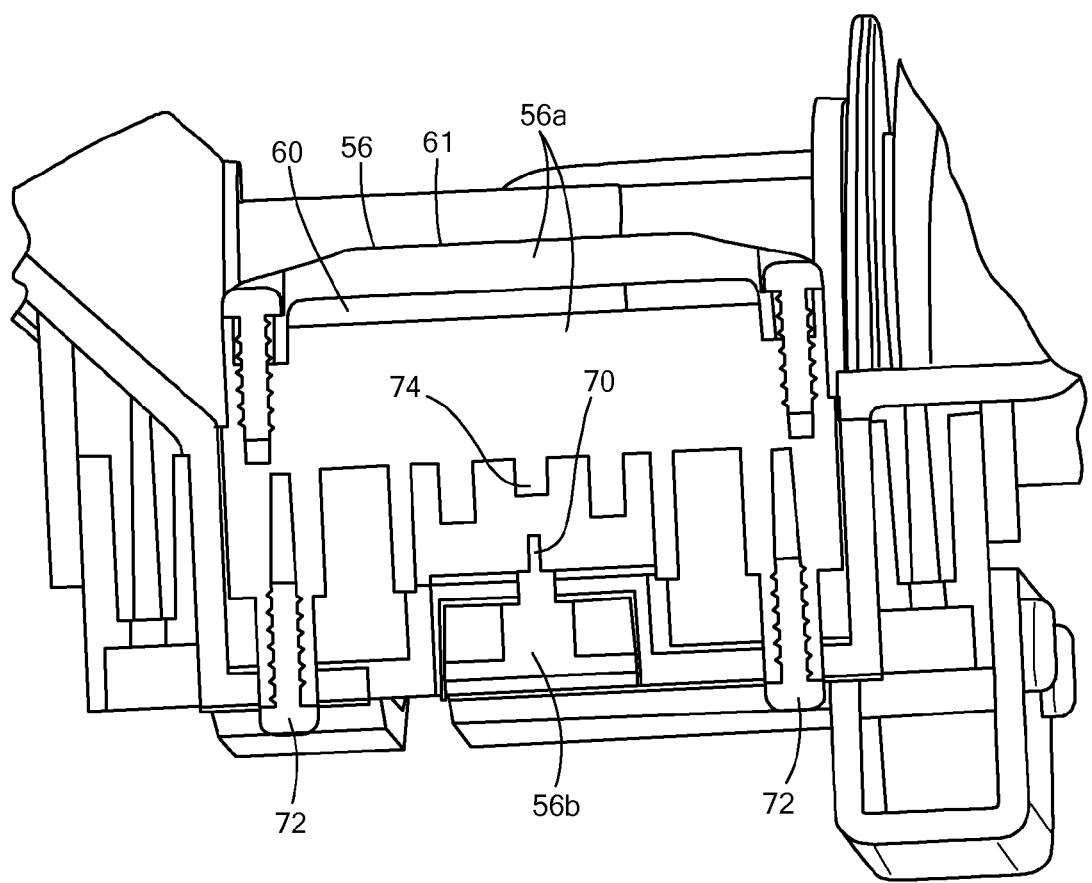
FIG. 15 schematically shows a cross-sectional view of the belt tension indicator system along lines B-B of FIG. 12 according to embodiments of the present invention.
Figure 16:
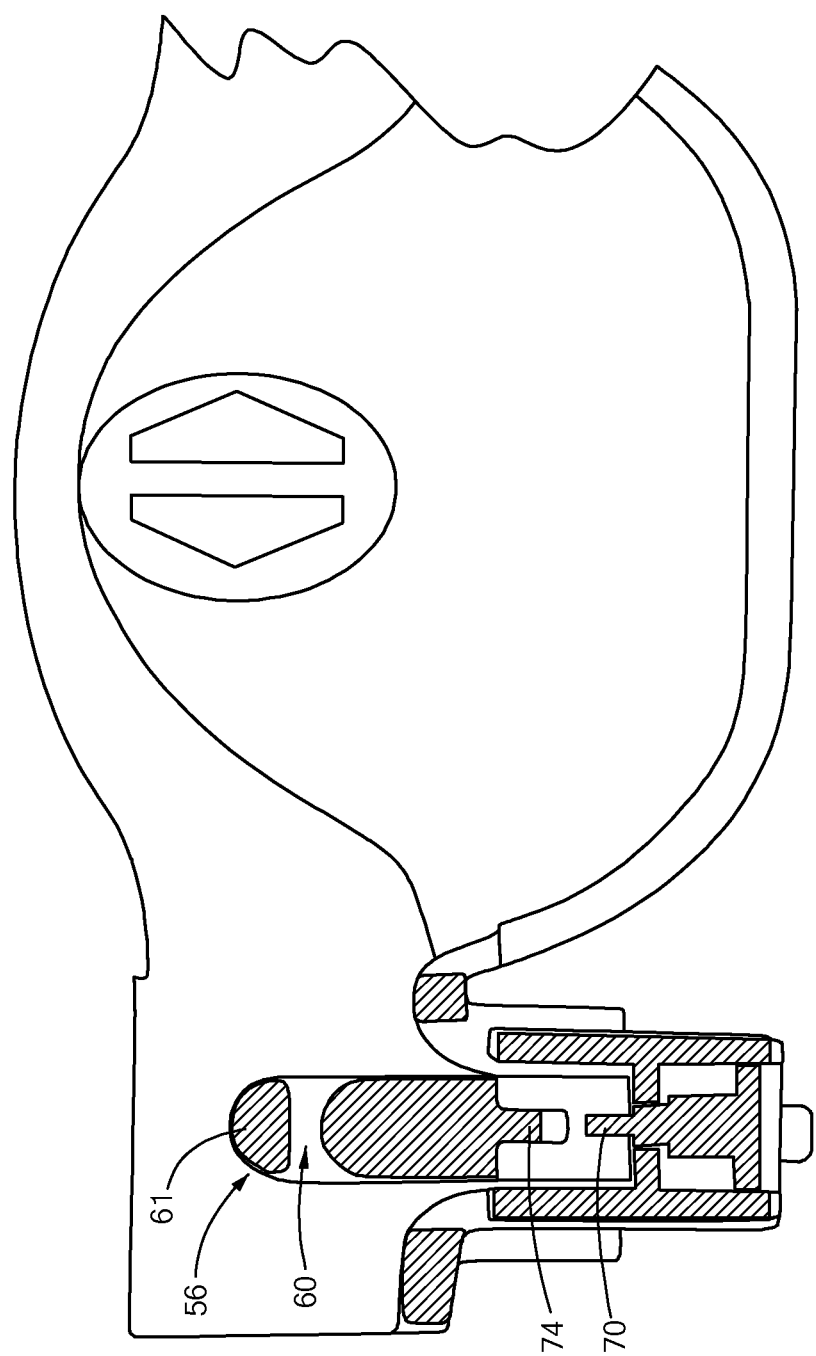
FIG. 16 schematically shows a cross-sectional view of the integrated ratchet system with belt tension indicator system along lines C-C of FIG. 12 according to embodiments of the present invention.

For the proper installation of the car seat 10 in the vehicle, the car seat base 12 should be positioned at an appropriate angle in relation to the vehicle seat (not shown). FIGS. 6 and 7 schematically show a perspective top view and side view, respectively, of a portion of the car seat base 12 showing an integrated level indicator system 20 according to embodiments of the present invention. As shown in FIGS. 6 and 7, the level indicator system 20 is mounted within the interior of the car seat base 12. As shown in greater detail in FIGS. 8-10, the level indicator system 20 includes a housing 22 that is coupled to the car seat base 12 and a pendulum 24 that is movably coupled to the housing 22 and is configured to permit rotation about an axis (shown as line a-a in FIGS. 8 and 10) of the system 20. The pendulum 24 includes a top portion 24a having an opening 26 and a bottom portion 24b that is configured such that it moves due to gravity based on the position of the level indicator system 20 relative to ground. As the bottom portion 24b moves forward or backward relative to the housing 22 and orthogonal to the axis, the top portion 24a moves in opposing directions from the bottom portion 24b, causing the pendulum 24 to move about the axis. The level indicator system 20 also includes one or more pair of sensors 28, such as photosensors, that are coupled to the housing 22 on opposing sides of the opening 26. For example, the pair of sensors 28 may be a photoemitter and a photoreceptor. The level indicator system 20 is positioned within the car seat base 12 such that the opening 26 and sensors 28 are substantially aligned when the car seat base 12 is in the proper orientation relative to the ground. In this configuration, the one sensor 28 on one side of the opening 26 is in communication with the other sensor 28 on the other side of the opening 26 when the opening 26 is substantially aligned with the pair of sensors 28. For example, a signal may pass through the opening 26 from the one sensor 28 to the other when the opening 26 is substantially aligned with the pair of sensors 28. For instance, light from a photoemitter may pass through the opening 26 and be detected by a photoreceptor when the car seat base 12 is properly angled.

As the car seat base 12 is tilted out of the proper orientation one way or the other, the bottom portion 24a of the pendulum 24 moves, causing the opening 26 in the top portion 24a to move out of alignment from the sensors 28 and other areas of the top portion 24a to block the path from the one sensor to the other. If more than one pair of sensors 28 is used, then several levels of alignment or misalignment of the base 12, as well as which direction the base 12 needs to be moved in, may be indicated. For example, if three pairs of sensors are used and are positioned adjacent to one another, then the level indicator system 20 may indicate when all three pairs of sensors are aligned with the opening, when only one or two pairs are aligned, or when none are aligned. If only one or two pairs of sensors are aligned, then the level indicator system 20 may indicate which of the pairs are aligned (e.g., the pair(s) toward the front or back of the level indicator system) and may indicate in which direction the car seat base 12 needs to move in order to be properly oriented.

The alignment of the base 12 may be indicated to an installer or other user through an integrated control console 30, such as shown in FIGS. 5 and 6. The control console 30 may include a user interface through which the person interacts with the console 30. The user interface may include inputs 32, such as a single or multiple knobs, buttons, switches, touch sensors, touch screens, or combinations thereof, for the person's input and feedback, and may include outputs 34, such as audio and/or visual devices, e.g., speakers, lights, LEDs, tactile sensors or transmitters, and visual displays, such as LCD screens, for providing the status of the alignment to the person. The control console 30 may also include circuitry (not shown) which receives signals from the sensors 28 in the level indicator system 20 and communicates with the user interface. The control console 30 may also receive signals from an integrated ratchet system, as discussed in more detail below. In addition, the control console 30 may include a power source (not shown), such as a battery, for providing power to the user interface. For example, a visual display screen may be illuminated, change color or flash when the proper alignment of the base 12 is achieved. In addition, the display screen may indicate an amount of alignment (e.g., not aligned, fair alignment, good alignment) and may indicate a direction (e.g., forward or backward) in which to move the base in order for it to be properly aligned in the vehicle. The control console 30 may be activated by interfacing with the user interface and may provide the information for a predetermined amount of time after which it may be deactivated in order to conserve power. For example, the installer may interface with one or more inputs 32 on the control console 30 to check the angle of the seat base 12, and one or more outputs 34 may provide the appropriate information as to whether the angle is correct or not. The control console 30 may also be used to lead the person, step by step, through a procedure for adjusting the seat base 12 as well as securing the child seat carrier 14 to the seat base 12 and securing the seat base 12 to the vehicle seat, as described in more below. In addition, the control console 30 may be removably attached to the seat base 12 so that its components may be easily repaired or replaced.

To properly position the seat base 12 within the vehicle, a level adjustment system may be used. As shown in FIGS. 1-3, 5 and 7, the level adjustment system includes a grooved member 40 coupled to the seat base 12 and a leveling member 36 movably coupled to the grooved member 40 and movably coupled to the seat base 12 at a front portion 12a of the seat base 12. In this way, the seat base 12 may be tilted forward or backward toward the front or back of the seat base 12 when the leveling member 36 is moved upward or downward relative to the bottom of the seat base 12 mainly towards the back of the seat base 12. The level adjustment system also includes one or more actuators 38, such as buttons, on the seat base 12 that actuate the movement of the leveling member 36 relative to the grooved member 40, e.g., when the buttons 38 are depressed. As shown in FIG. 7, the grooved member 40 has one or more slots 42 and a channel 46 adjacent to the slots 42. The level adjustment system also includes a bar 44 coupled to the leveling member 36 and configured to engage with the one or more slots 42 and move along the channel 46. When the actuators 38 are actuated, such as buttons being depressed, this causes the bar 44 to move out of one slot 42 and travel along the channel 46 adjacent to the slots 42. When the actuators 38 are actuated, such as the buttons being released, the bar 44 moves into and engages the nearest adjacent slot 42. In this way, the leveling member 36 moves upward or downward, mainly towards the back portion of the seat base 12, relative to the seat base 12 as the bar 44 moves upward or downward.

As shown in FIGS. 5-7, the car seat base 12 may also include an integrated ratchet system 50 that allows the seat base 12 to be properly secured to the vehicle seat. As shown in greater detail in FIGS. 11-16, the integrated ratchet system 50 includes a housing 51, a handle 52 movably coupled to the housing 51, and a spindle 54 movably coupled to the handle 52 and movably coupled to the housing 51. The spindle 54 has a longitudinal slot 58 that is configured to receive and hold a belt (not shown). For example, one side of the belt is positioned at the bottom of the slot 58 and feed up through the slot 58 until the belt is positioned within the slot 58 and between the two portions of the spindle 54. The integrated ratchet system 50 may also include a belt tension indicator system 56 that indicates when an appropriate amount of tension is applied to the belt.

Figure 17:
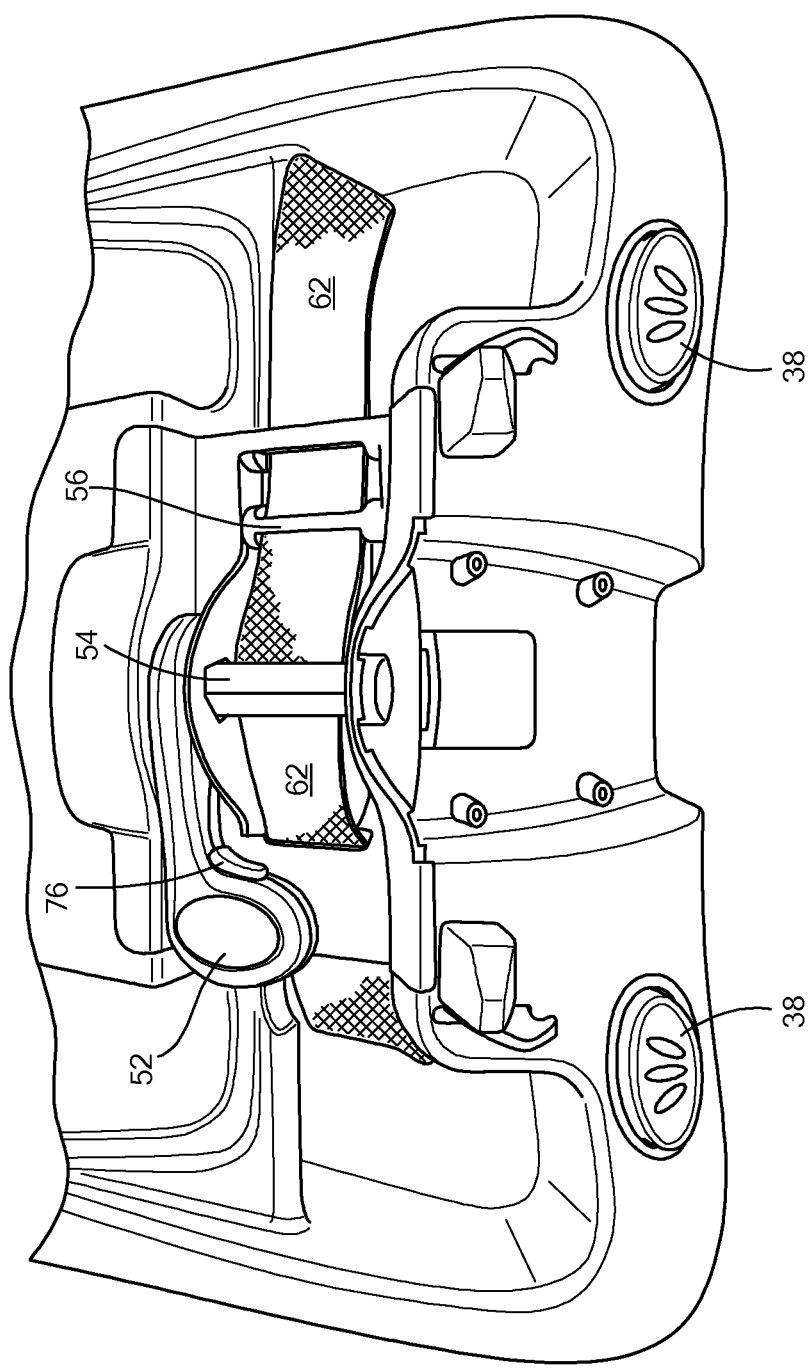
FIG. 17 shows a perspective top view of a portion of a car seat base with a belt inserted into an integrated ratchet system according to embodiments of the present invention.

During operation, the belt is positioned in the slot 58 in the spindle 54 and positioned through an opening 60 in, or over the top of, the belt tension indicator system 56. The belt is also positioned through openings in the housing 51. FIG. 17 shows a portion of a seat base 12 with a belt 62 inserted into an integrated ratchet system 50 according to one embodiment of the present invention. The belt may be a separate, standalone belt or may be one of the seat belts in the vehicle. As known by those skilled in the art, the belt may be secured to one or more anchored locations in the vehicle. When a separate belt is used, visual indicators on the belt may be used to appropriately position the belt within the integrated ratchet system 50, e.g., by positioning the center of the belt on the spindle 54. The two ends of the separate belt may also include standard seat belt buckle attachment ends that insert into the vehicle's existing seat belt buckle.

Once the belt is positioned within the integrated ratchet system 50, the handle 52 may be moved from one side of the housing 51 to the other. As the handle 52 moves in one direction, the spindle 54 rotates, causing the belt to wind around the spindle 54. However, as the handle 52 moves back in the other direction, the spindle 54 is prevented from rotating so that the belt does not unwind from the spindle 54. As shown in greater detail in FIGS. 13 and 14, this is accomplished by the handle 52 moving a ratchet wheel 68 when the handle 52 moves in one direction. Then, when the handle 52 moves back in the other direction, a pawl 64 prevents the ratchet wheel 68 from moving with the handle 52 by engaging notches 66 in the ratchet wheel 68. Thus, as known by those skilled in the art, the pawl 64 and ratchet wheel 68 are configured to permit motion of the wheel 68 with the handle 52 in one direction, but prevent motion of the wheel 68 with the handle 52 in the reverse direction. Consequently, the spindle 54, which is coupled to the ratchet wheel 68, only rotates in one direction during this operation. For example, as the handle 52 is moved from right to left, the ratchet wheel 68 and spindle 54 rotate in a counter-clockwise direction, but when the handle 52 is moved back to the right, the pawl 64 engages the notches 66 on the ratchet wheel 68, preventing the wheel 68, and thus the spindle 54, from rotating back clockwise. In this manner, the belt becomes continuously wound around spindle 54. The process of rotating the handle 52 back and forth may be repeated as necessary, until the belt becomes sufficiently tight within the integrated ratchet system 50.

The amount of tension in the belt may be determined by the belt tension indicator system 56. As shown in greater detail in FIGS. 14-16, the belt tension indicator system 56 includes a bottom member 56b coupled to the housing 51 and a top member 56a movably coupled to the bottom member 56b that a belt contacts. The top member 56a includes an opening 60 configured such that a belt may be positioned through the opening 60 and includes a surface 61 configured such that a belt may be positioned over, and in contact with, the surface 61. The belt tension indicator system 56 also includes a switch or plunger 70 adjacent to the top member 56a and one or more resistance members 72 positioned between a portion of the top member 56a and a portion of the bottom member 56b. The one or more resistance members 72 allow the top member 56a to move relative to the bottom member 56b when sufficient force is applied to the top member 56a, e.g., by the belt. The resistance members 72 may be springs or other mechanisms known in the art.

During operation, a belt is positioned through the opening 60, or over the surface 61, in the top member 56a. For example, when a separate, standalone belt is used, the belt may be positioned through the opening 60 and when one of the seat belts in the vehicle is used, the belt may be positioned over the surface 61. As the belt becomes more tightly wound around the spindle 54, the belt applies progressively more force to the top member 56a of the belt tension indicator system 56, moving the top member 56a closer to the bottom member 56b. The belt tension indicator system 56 is configured such that a contact 74 on the bottom of the top member 56a contacts the switch 70 when an appropriate force is applied to the top member 56a by the belt, thus indicating when sufficient tension is applied to the belt. When the switch 70 contacts the contact 74, an indication may be provided to the installer. For example, the belt tension indicator system 56 may send a signal to the control console 30 indicating that the proper amount of belt tension has been achieved, and the control console 30 may display an appropriate indicator to the person that the seat base 12 is sufficiently secure.

If the switch 70 is configured to measure the amount of force applied to the switch or to determine the position of the switch as it is depressed, then the amount of tension in the belt may be determined. This may provide the installer with information regarding the progress of the belt tightening process. For example, the control console 30 may indicate whether the seat base 12 is appropriately secured based on the amount of tension in the belt (e.g., not secure, fairly secure, secure, too tight) and may indicate whether to tighten or loosen the belt in order for it to be properly secured within the vehicle. As mentioned above with regard to the level indicator system 20, the installer may similarly interface with the control console 30 to check the belt tension, and the control console 30 may provide the appropriate information as to whether the belt tension is correct or not. In addition, the control console 30 may also be used to lead the person, step by step, through a procedure for tightening the belt and indicating when the integrated ratchet system 50 has sufficiently secured the seat base 12 to the vehicle seat.

To loosen the belt in the integrated ratchet system 50, a release mechanism 76 may be used to allow the spindle 54 to rotate in either direction. For example, the release mechanism 76 may be actuated by depressing a button 76 on the handle 52 while moving the handle 52 from one side to the other. This may cause the pawl 64 to disengage from the ratchet wheel 68, allowing the spindle 54 to freely rotate. When the button is released and the handle returned to its starting position, the pawl 64 is configured to reengage with the ratchet wheel 68.

Embodiments of the integrated ratchet system 50, control console 30 and/or level indicator system 20 permit the proper installation of the child car seat 10 within the vehicle to be performed without undue difficulty. In addition, embodiments allow much of the subjective judgment currently used in the car seat installation process to be removed.

Although the above discussion discloses various exemplary embodiments of the invention, it should be apparent that those skilled in the art can make various modifications that will achieve some of the advantages of the invention without departing from the true scope of the invention.

What is claimed is:

1. A child car seat comprising:
   a seat base configured to hold a child seat carrier; and
   a ratchet system including
      a housing directly attached to the seat base;
      a handle movably coupled to the housing;
      a spindle movably coupled to the handle and to the housing, the spindle having a longitudinal slot configured to hold a belt, and the ratchet system configured to rotate the spindle with the handle in a first direction and to rotate the handle in a second direction, opposite from the first direction, without rotating the spindle; and
      a belt tension indicator system directly attached to the housing.

2. The child car seat of claim 1, further including a control console removably coupled directly to the seat base and in communication with the ratchet system.

3. The child car seat of claim 2, wherein the control console further includes a user interface having at least one input and at least one output.

4. A child car seat comprising:
   a seat base configured to hold a child seat carrier; and
   a ratchet system including
      a housing coupled to the seat base;
      a handle movably coupled to the housing;
      a spindle movably coupled to the handle and to the housing, the spindle having a longitudinal slot configured to hold a belt and the ratchet system configured to move the spindle with the handle in a first direction and to move the handle in a second direction without moving the spindle; and
      a belt tension indicator system coupled to the housing, wherein the belt tension indicator system includes:
   a bottom member coupled to the housing;
   a top member movably coupled to the bottom member, the top member configured to contact the belt;
   one or more resistance members positioned between a portion of the top member and a portion of the bottom member, the one or more resistance members configured to allow the top member to move relative to the bottom member when sufficient force is applied to the top member; and
   a switch positioned adjacent to the top member, the belt tension indicator system configured such that a contact on the top member contacts the switch when appropriate force is applied to the top member.

5. The child car seat of claim 4, further including a control console removably coupled to the seat base and in communication with the belt tension indicator system, the belt tension indicator system configured to send a signal to the control console when the contact contacts the switch.

6. The child car seat of claim 4, wherein the one or more resistance members include springs.

7. The child car seat of claim 4, wherein the top member includes an opening configured to receive the belt.

8. The child car seat of claim 1, further including the belt.

9. The child car seat of claim 1, wherein the ratchet system further includes a release mechanism that allows the spindle to rotate in the first direction and the second direction.

10. The child car seat of claim 9, wherein the release mechanism is actuated by a button on the handle.

11. The child car seat of claim 1, wherein the ratchet system further includes:
   a ratchet wheel movably coupled to the handle and coupled to the spindle, the ratchet wheel having one or more notches; and
   a pawl configured to engage with the one or more notches, the ratchet wheel and the pawl configured such that the handle moves the ratchet wheel when the handle rotates in the first direction and the pawl engages the one or more notches and prevents the ratchet wheel from moving when the handle rotates in the second direction.

* * * * *